United States Patent [19]

Hojo et al.

[11] Patent Number: 5,060,072
[45] Date of Patent: Oct. 22, 1991

[54] CCD IMAGER WITH POSITIVE AND MIRROR IMAGE OUTPUT

[75] Inventors: Junichi Hojo; Naoki Kato; Toshiaki Wakayama; Kazuhide Fujikawa, all of Kanagawa, Japan

[73] Assignee: Sony Corporation, Tokyo, Japan

[21] Appl. No.: 583,218

[22] Filed: Sep. 17, 1990

[30] Foreign Application Priority Data

Sep. 12, 1989 [JP] Japan .................. 1-246195

[51] Int. Cl.$^5$ .................. H04N 3/14; H04N 5/335
[52] U.S. Cl. .................. 358/213.11; 358/213.15; 358/213.29
[58] Field of Search .............. 358/209, 213.11, 213.13, 358/213.15, 213.19, 213.24, 213.26, 213.29, 223, 108

[56] References Cited

U.S. PATENT DOCUMENTS

| | | | |
|---|---|---|---|
| 4,214,266 | 7/1980 | Myers | 358/108 |
| 4,277,804 | 7/1981 | Robinson | 358/108 |
| 4,774,571 | 9/1988 | Mehdipour | 358/108 |
| 4,910,591 | 3/1990 | Petrossian et al. | 358/103 |

Primary Examiner—Howard W. Britton
Assistant Examiner—Tuan V. Ho
Attorney, Agent, or Firm—Hill, Van Santen, Steadman & Simpson

[57] ABSTRACT

A charge-coupled device (CCD) imager is comprised of a CCD image sensor, a horizontal register for delivering an image signal from the CCD image sensor, the horizontal register being formed of an effective bit portion corresponding to the CCD image sensor and first and second dummy bit portions of a predetermined length which are located at both sides of the effective bit portion, and first and second output portions provided in succession to the first and second dummy bit portions to provide a positive image signal and a mirror image signal, wherein the effective bit portion is provided with four bus lines through which a transfer clock is supplied to the horizontal register and the first and second dummy bit portions are provided with two bus lines through which a transfer clock is supplied to the horizontal register. Thus, the CCD imager can be simplified in arrangement and a undesirable charge can be prevented from being mixed into a signal charge.

7 Claims, 3 Drawing Sheets

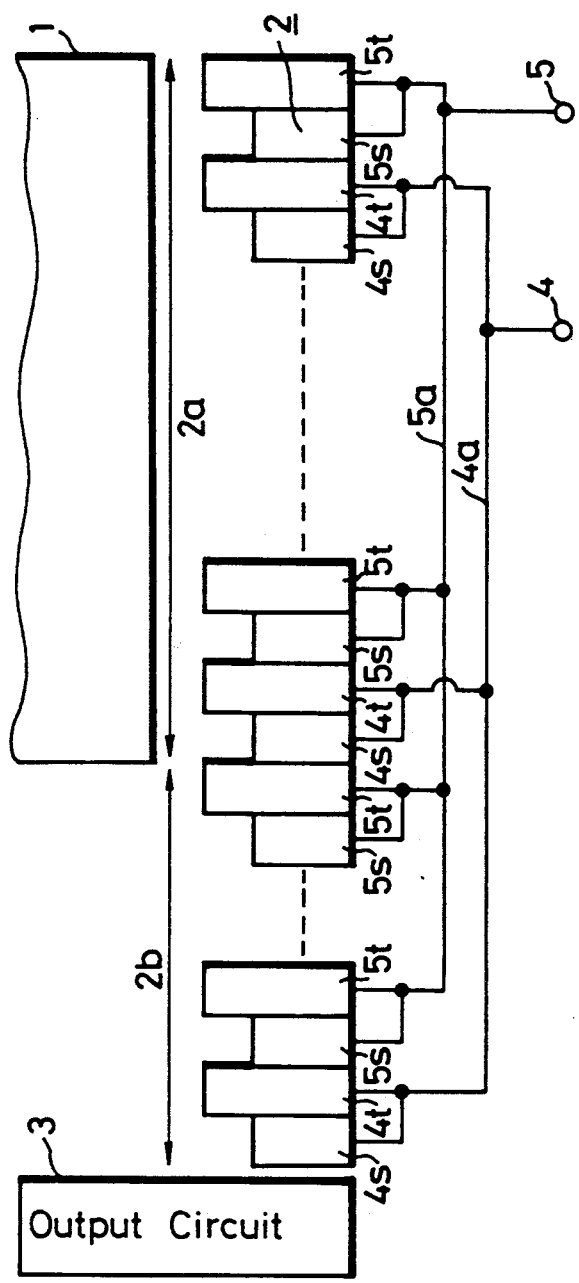
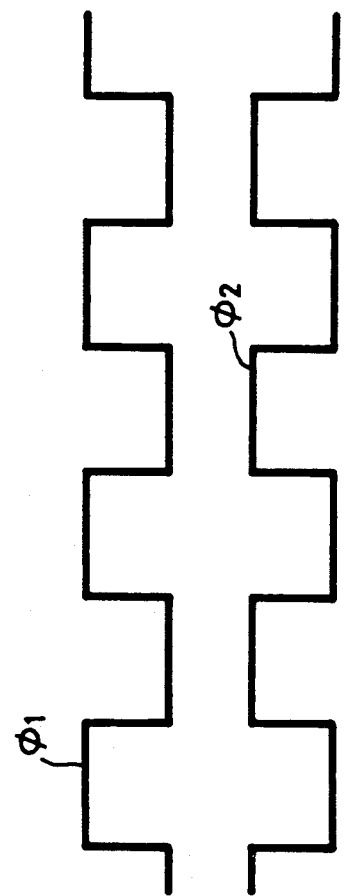
F I G. 1
(PRIOR ART)
F I G. 2A
(PRIOR ART)
F I G. 2B
(PRIOR ART)

CCD IMAGER WITH POSITIVE AND MIRROR IMAGE OUTPUT

BACKGROUND OF THE INVENTION

1. Field of the Invention

The present invention generally relates to a charge-coupled device (CCD) imager and, more particularly, is directed to a CCD imager for use with a video telephone, for use in a rear portion of an automobile or the like and which provides a positive image picture and a mirror image picture.

2. Description of the Prior Art

A CCD pickup device or CCD imager utilizing a horizontal of two-phase drive CCD configuration is proposed as shown in FIG. 1.

Referring to FIG. 1, there is provided a CCD imager sensor portion 1 is of a type in the prior art. An image signal from the CCD image sensor portion 1 is supplied to a horizontal register portion 2, and an image signal from the horizontal register 2 is outputted through an output circuit 3 of a floating diffusion amplifier configuration.

The horizontal register 2 is constructed as a two-phase drive CCD. More specifically, in FIG. 1, reference numerals 4s, 4t, 5s and 5t respectively designate a first storage electrode, a first transfer electrode, a second storage electrode and a second transfer electrode which are respectively formed on a first storage portion, a first transfer portion, a second storage portion and a second transfer portion of transfer channels formed on a semiconductor substrate for forming a CCD, though not shown. The first storage electrode 4s, the first transfer electrode 4t, the second electrode 5s and the second transfer electrode 5t of a number are repeatedly arranged in one direction, in that order.

The adjacent first storage electrode 4s and first transfer electrode 4t are interconnected together, and a junction therebetween is interconnected through a bus line 4a to a first drive pulse input terminal 4. Also, the adjacent second storage electrode 5s and second transfer electrode 5t are interconnected together, and a junction therebetween is interconnected through a bus line 5a to a second drive pulse input terminal 5. The first and second drive pulse input terminals 4 and 5 are supplied with first and second drive pulses $\phi1$ and $\phi2$. The first and second drive pulses $\phi1$ and $\phi2$ are transfer clocks and are different in phase as shown in FIGS. 2A and 2B. In this case, they are so formed that when the first and second storage electrodes 4s and 5s and the first and second transfer electrodes 4t and 5t are supplied with the same voltage, the potential wells formed beneath the storage electrodes 4s and 5s become slightly deeper than those beneath the transfer electrodes 4t and 5t.

The horizontal register 2 is comprised of an effective bit portion 2a provided in response to the CCD image sensor portion 1 and having the number of bits corresponding to the number of its horizontal pixels and a dummy bit portion 2b of, for example, 16 bits continuous to the effective bit portion 2a. When the first and second drive pulses $\phi1$ and $\phi2$ are respectively supplied to the first and second drive pulse input terminals 4 and 5, a charge in the effective bit portion 2a is transferred through the dummy bit portion 2b to the output circuit 3 so that the output circuit 3 derives a normal image signal, i.e., a positive image signal.

Incidentally, in order to provide an image of video telephone, an image of the rear portion of an automobile or the like, a mirror image picture is convenient. Therefore, in the CCD imager shown in FIG. 1, a proposal shown in FIG. 3 is provided to generate a mirror image signal and a positive image signal which make a mirror image picture. In FIG. 3, like parts corresponding to those of FIG. 1 are marked with the same references and therefore need not be described in detail.

With reference to FIG. 3, the horizontal register 2 is provided in an opposing relation to the CCD image sensor portion 1 and is comprised of the effective bit portion 2a having bits of number corresponding to the number of horizontal pixels and dummy bit portions 2b and 2c of, for example, 16 bits continuous to the effective bit portion 2a at its both sides. The positive image output circuit 3 and a mirror image output circuit 6 are made continuous to the dummy bit portions 2b and 2c, respectively.

In each of the effective bit portion 2a and the dummy bit portions 2b and 2c of this horizontal register 2, similarly to the CCD imager shown in FIG. 1, the first storage electrode 4s, the first transfer electrode 4t, the second storage electrode 5s and the second transfer electrode 5t are repeatedly arranged in that order, whereas the potential wells beneath these electrodes 4s, 4t, 5s and 5t are constructed similarly to those of the example of FIG. 1.

In this example, the first storage electrodes 4s are coupled together by a bus line $4a_1$ to which a transfer clock is supplied, and a first drive pulse input terminal 4sp is led out from the bus line $4a_1$. The first transfer electrodes 4t are coupled together by a bus line $4a_2$ to which a transfer clock is supplied, and a second drive pulse input terminal 4tp is led out from the bus line $4a_2$. The second storage electrodes 5s are coupled together by a bus line $5a_1$ to which a transfer clock is supplied, and a third drive pulse input terminal 5sp is led out from the bus line $5a_1$. Further, the second transfer electrodes 5t are coupled together by a bus line $5a_2$ to which a transfer clock is supplied, and a fourth drive pulse input terminal 5tp is led out from the bus line $5a_2$.

When the positive image output circuit 3 derives a positive image signal to provide a positive image, the first drive pulse $\phi1$ is supplied to the first and second drive pulse input terminals 4sp and 4tp as a transfer clock and the second drive pulse $\phi2$ is supplied to the third and fourth drive pulse input terminals 5sp and 5tp as a transfer clock.

When the mirror image output circuit 6 derives a mirror image signal to provide a mirror image, the first drive pulse $\phi1$ is supplied to the second and third drive pulse input terminals 4tp and 5sp as a transfer clock, while the second drive pulse $\phi2$ is supplied to the first and fourth drive pulse input terminals 4sp and 5tp as a transfer clock. The rest of the arrangement of FIG. 3 is constructed the same as that of FIG. 1.

In the example of FIG. 3 as mentioned above, the first and second drive pulses $\phi1$ and $\phi2$ are selectively supplied to the first, second, third and fourth drive pulse input terminals 4sp, 4tp, 5sp and 5tp as the transfer clocks, whereby the positive image output circuit 3 can derive the positive image signal or the mirror image output circuit 6 can derive the mirror image signal.

The CCD imager shown in FIG. 3, however, needs four bus lines $4a_1$, $4a_2$, $5a_1$ and $5a_2$ to supply the first and second drive pulses $\phi1$ and $\phi2$ to the horizontal register 2, which provides the larger circuit pattern. Particularly, near the output circuits 3 and 6 provided at the two ends of the horizontal register 2, the pattern arrangement becomes considerably difficult.

Further, depending upon the operation conditions of the output circuits, a undesirable charge is mixed into the horizontal register from the output circuit which is not operated, for example, from the mirror image output circuit 6 when the positive image signal is obtained or from the positive image output circuit 3 when the mirror image signal is obtained.

OBJECTS AND SUMMARY OF THE INVENTION

Accordingly, it is an object of the present invention to provide an improved CCD imager which can eliminate the aforenoted shortcomings and disadvantages encountered with the prior art.

More specifically, it is an object of the present invention to provide a CCD imager of simplified arrangement.

It is another object of the present invention to provide a CCD imager in which undesirable charges can be prevented from being entered into a horizontal register.

It is a further object of the present invention to provide a CCD imager which is for use with a video telephone, a video camera located in a rear side of an automobile as a rearview mirror and the like.

As an aspect of the present invention, a charge-coupled device (CCD) imager is comprised of a CCD image sensor, a horizontal register for generating an image signal from the CCD image sensor, the horizontal register being formed of an effective bit portion corresponding to the CCD image sensor and first and second dummy bit portions of a predetermined length which are located at both sides of the effective bit portion, and first and second output portions provided in succession to the first and second dummy bit portions to provide a positive image signal and a mirror image signal, wherein the effective bit portion is provided with four bus lines through which a transfer clock is supplied to the horizontal register and the first and second dummy bit portions are provided with two bus lines through which a transfer clock is supplied to the horizontal register. Thus, the CCD imager can be simplified in arrangement and a undesirable charge can be prevented from being mixed into a signal charge.

The preceding, and other objects, features and advantages of the present invention will be apparent in the following detailed description of a preferred embodiment when read in conjunction with the accompanying drawings, in which like reference numerals are used to identify the same or similar parts.

BRIEF DESCRIPTION OF THE DRAWINGS

FIG. 1 is a schematic diagram showing an example of a prior-art CCD imager;

FIG. 2A and 2B are schematic diagrams of first and second drive pulses, and to which reference will be made in explaining an operation of the conventional CCD imager of FIG. 1;

DETAILED DESCRIPTION OF A PREFERRED EMBODIMENT

Figure 3:
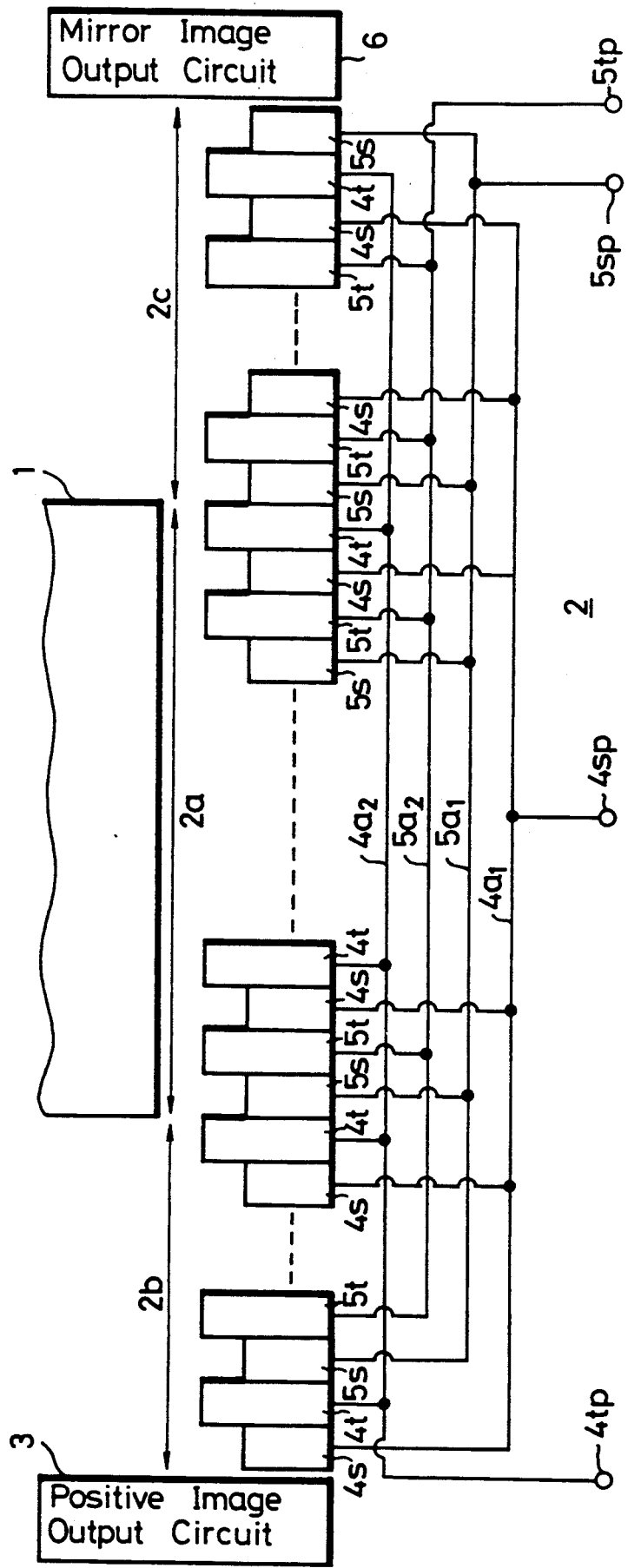
FIG. 3 is a schematic diagram showing an example of a prior-art CCD imager which derives a positive image signal and a mirror image signal to provide a positive image and a mirror image.
Figure 4:
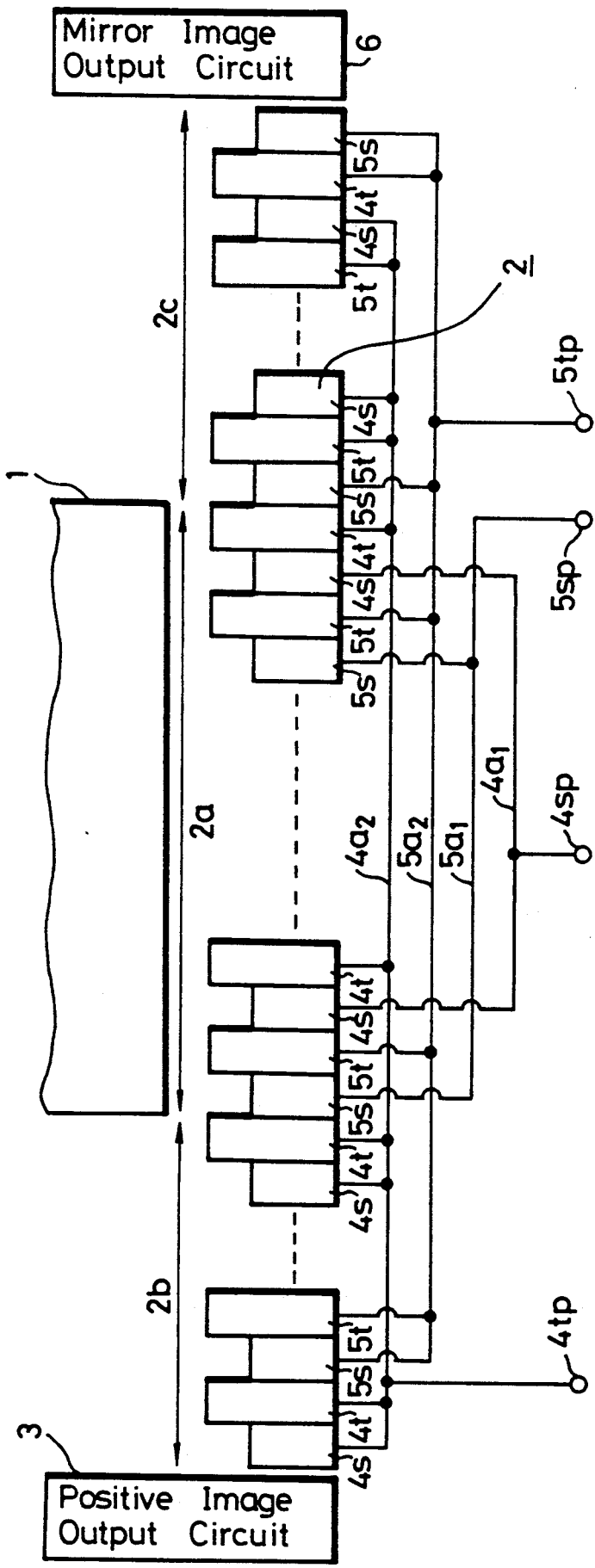
FIG. 4 is a schematic diagram showing an embodiment of a CCD imager according to the present invention.

An embodiment of a CCD imager according to the present invention will now be described with reference to the drawings. In FIG. 4, like parts corresponding to those of FIGS. 1 and 3 are marked with the same references and therefore need not be described in detail.

In this embodiment, as shown in FIG. 4, the horizontal register 2, which derives the image signal from the CCD image sensor portion 1, is provided in an opposing relation to the CCD image sensor portion 1. The horizontal register portion 2 is comprised of the effective bit portion 2a having bits of the number corresponding to the number of pixels in the horizontal direction and the dummy bit portions 2b and 2c of, for example, 16 bits continuous to the effective bit portion 2a at its both sides. The positive image output circuit 3 and the mirror image output circuit 6 are respectively made continuous to the dummy bit portions 2b and 2c. The positive image output circuit 3 and the mirror image output circuit 6 are constructed in the same fashion. That is, each of the output circuits 3 and 6 is comprised of, for example, a floating diffusion amplifier which is comprised of a horizontal transfer gate HOG, a floating diffusion FD, a reset gate RG, a reset drain RD and an amplifier which amplifies a potential displacement of the floating diffusion FD, though not shown.

In the effective bit portion 2a and the dummy bit portions 2b and 2c of the horizontal register 2, the first storage electrode 4s, the first transfer electrode 4t, the second storage electrode 5s and the second transfer electrode 5t are repeatedly provided in that order, similarly to FIG. 1. In that case, these electrodes are so formed that when the same voltage is applied to the first and second storage electrodes 4s, 5s and the first and second transfer electrodes 4t, 5t, the potential wells beneath the storage electrodes 4s and 5s become slightly deeper than those provided beneath the transfer electrodes 4t and 5t.

In this embodiment, the first storage electrodes 4s in the effective bit portion 2a of the horizontal register 2 are coupled together by the bus line $4a_1$ to which the transfer clock is supplied, and the first drive pulse input terminal 4sp is led out from the bus line $4a_1$. The first transfer electrodes 4t in the effective bit portion 2a are coupled together by the bus line $4a_2$ to which the transfer clock is supplied, and the bus line $4a_2$ is connected to the first storage electrodes 4s and the first transfer electrodes 4t in the dummy bit portion 2b.

Further, the bus line $4a_2$ is connected to the first storage electrodes 4s and the second transfer electrodes 5t of the dummy bit portion 2c, and the second drive pulse input terminal 4tp is led out from the bus line $4a_2$. The second storage electrodes 5s of the effective bit portion 2a are coupled together by the bus line $5a_1$ to which the transfer clock is supplied, and the third drive pulse input terminal 5sp is led out from the bus line $5a_1$. The second transfer electrodes 5t of the effective bit portion 2a are coupled together by the bus line $5a_2$ to which the transfer clock is supplied, and this bus line $5a_2$ is connected to the second storage electrodes 5s and the second transfer electrodes 5t of the dummy bit portion 2b. Furthermore, the bus line $5a_2$ is connected to the first transfer electrodes 4t and the second storage electrodes 5s of the dummy bit portion 2c, and the fourth drive pulse input terminal 5tp is led out from the bus line $5a_2$.

According to this embodiment, when the positive image output circuit 3 derives the positive image signal to provide the positive image picture, the first drive pulse $\phi1$ is supplied to the first and second drive pulse input terminals 4*sp* and 4*tp* as the transfer clock, and the second drive pulse $\phi2$ is supplied to the third and fourth drive pulse input terminals 5*sp* and 5*tp* as the transfer clock. In that case, the charges in the effective bit portion 2*a* and the dummy bit portion 2*b* of the horizontal register 2 are transferred to the positive image output circuit 3 side, whereas the charges in the dummy bit portion 2*c* are transferred to the mirror image output circuit 6 side and hence are not transferred to the positive image output circuit 3 side.

When the mirror image output circuit 6 derives the mirror image signal to provide the mirror image picture, the first drive pulse $\phi1$ is supplied to the second and third drive pulse input terminals 4*tp* and 5*tp* as the transfer clock, and the second drive pulse $\phi2$ is supplied to the first and fourth drive pulse input terminals 4*sp* and 5*tp* as the transfer clock. In that case, the charges in the effective bit portion 2*a* and the dummy bit portion 2*c* of the horizontal register 2 are transferred to the mirror image output circuit 6 side, whereas the charges in the dummy bit portion 2*b* are transferred to the positive image output circuit 3 side but are not transferred to the mirror image output circuit 6 side. In this embodiment, the rest of the arrangement is constructed in the same fashion as those of FIGS. 1 and 3.

Since the CCD imager of this embodiment is constructed as described above, when the positive image signal, which produces the positive image picture, is obtained from the positive image output circuit 3, the first drive pulse $\phi1$ is supplied to the first and second drive pulse input terminals 4*sp* and 4*tp* as the transfer clock, while the second drive pulse $\phi2$ is supplied to the third and fourth drive pulse input terminals 5*sp* and 5*tp* as the transfer clock. At that time, the signal charge from the effective bit portion 2*a* of the horizontal register 2 is transferred through the dummy bit portion 2*b* to the positive image output circuit 3 and the positive image output circuit 3 derives the positive image signal, from which the positive image picture is obtained. In that case, since the charges in the dummy bit portion 2*c* are not transferred to the positive image output circuit 3 side, a undesirable charge from the mirror image output circuit 6 in non-use is not mixed into the signal charge.

When the mirror image signal, which provides the mirror image picture, is obtained from the mirror image output circuit 6, the first drive pulse $\phi1$ is supplied to the second and third drive pulse input terminals 4*tp* and 5*sp* as the transfer clock, and the second drive pulse $\phi2$ is supplied to the first and fourth drive pulse input terminals 4*sp* and 5*tp* as the transfer clock. At that time, the signal charge from the effective bit portion 2*a* of the horizontal register 2 is transferred through the dummy bit portion 2*c* to the mirror image output circuit 6, and the mirror image output circuit 6 generates the mirror image signal to provide the mirror image picture. In that case, since the charge in the dummy bit portion 2*b* is not transferred to the mirror image output circuit 6 side, a undesirable charge from the positive image output circuit 3 upon non-use is not mixed into the signal charge.

Further, in this embodiment, since the dummy bit portion 2*b* transfers the signal charge only to the positive image output circuit 3 side, the dummy bit portion 2*c* transfers the signal charge only to the mirror image output circuit 6 side and the two bus lines 4$a_2$ and 5$a_2$ are provided, through which the transfer clocks are transferred to the dummy bit portions 2*b* and 2*c*, the circuit patterns near the positive image output circuit 3 and the mirror image output circuit 6 can be simplified.

According to the embodiment of the present invention, it is possible to obtain the CCD imager which can provide the positive image picture and the mirror image picture. Further, the CCD imager of the invention can be simplified in arrangement, and the undesirable charge can be prevented from being mixed into the signal charge.

Having described a preferred embodiment of the invention with reference to the accompanying drawings, it is to be understood that the invention is not limited to that precise embodiment and that various modifications and variations thereof could be effected by one skilled in the art without departing from the spirit or scope of the novel concepts of the invention as defined in the appended claims.

We claim as our invention

1. A charge-coupled device (CCD) imager comprising:
   a) a CCD image sensor;
   b) a horizontal register for delivering an image signal from said CCD image sensor, said horizontal register being formed of an effective bit portion corresponding to said CCD image sensor and first and second dummy bit portions of a predetermined length, said first and second dummy bit portions being located at both sides of said effective bit portion; and
   first and second output portions provided in succession to said first and second dummy bit portions to provide a positive image signal and a mirror image signal, wherein said effective bit portion is connected with four bus lines through which a transfer clock is supplied to said horizontal register and said first and second dummy bit portions are each connected with only two of said four bus lines through which a transfer clock is supplied to said horizontal register.

2. The CCD imager according to claim 1, wherein said horizontal register is formed of a two-phase drive CCD.

3. The CCD imager according to claim 1, wherein the number of bits of said effective bit portion corresponds to the number of pixels of said CCD image sensor in the horizontal direction and the number of each of bits of said first and second dummy bit portions is 16 bits.

4. The CCD imager according to claim 1, wherein said transfer clocks are first and second drive pulses the phases of which are different.

5. The CCD imager as claimed in claim 1, wherein each of said effective bit portion and first and second dummy bit portions is formed of a number of first storage electrodes, first transfer electrodes, second storage electrodes and second transfer electrodes arranged repeatedly.

6. The CCD imager as claimed in claim 1, wherein the first storage electrodes in said effective bit portion are connected together by a first bus line, the first transfer electrodes in said effective bit portion, the first storage and transfer electrodes in said first dummy bit portion, and the first storage electrodes and the second transfer electrodes in said second dummy bit portion are connected together by a second bus line, the second storage electrodes in said effective bit portion are connected together by a third bus line, and the second transfer electrodes in said effective bit portion, the second storage and transfer electrodes in said first dummy bit portion, and the first transfer electrodes and the second storage electrodes in said second dummy bit portion are connected together by a fourth bus line.

7. The CCD imager as claimed in claim 6, wherein first, second, third and fourth drive signal input terminals are led out from said first, second, third and fourth bus lines, respectively.

* * * * *